United States Patent [19]

Morton

[11] Patent Number: 4,555,214

[45] Date of Patent: Nov. 26, 1985

[54] TOW BAR FOR SEMI-TRACTORS HAVING TRIANGULATED SUPPORT SYSTEM AND ADJUSTABLE DUAL CYLINDER HYDRAULIC CONTROL

[76] Inventor: James F. Morton, 3800 Cheryl St., Bucyrus, Ohio 44820

[21] Appl. No.: 450,974

[22] Filed: Dec. 20, 1982

[51] Int. Cl.[4] ............................................... B60P 3/12
[52] U.S. Cl. .................................... 414/563; 280/402; 280/415 B; 280/423 B
[58] Field of Search ............... 280/402, 415 A, 415 B, 280/423 B, 477, 478 A, 479 A, 486, 490 R, 490 A, 491 R, 491 A, 423 R, 503; 414/563

[56] References Cited

U.S. PATENT DOCUMENTS

| | | | |
|---|---|---|---|
| 3,649,048 | 3/1972 | Garnett | 280/477 |
| 3,687,315 | 8/1972 | Donaldson | 280/402 X |
| 3,715,042 | 2/1973 | Rellinger | 414/563 |
| 3,767,069 | 10/1973 | White, Jr. et al. | 414/563 |
| 3,951,280 | 4/1976 | Peck | 414/563 |
| 4,047,733 | 9/1977 | Parkes | 280/402 |
| 4,149,643 | 4/1979 | Skala et al. | 414/563 |
| 4,152,006 | 5/1979 | Dunlap | 280/402 |
| 4,316,617 | 2/1982 | Flaugh | 280/402 |

Primary Examiner—Joseph F. Peters, Jr.
Assistant Examiner—Mitchell J. Hill
Attorney, Agent, or Firm—Porter, Wright Morris & Arthur

[57] ABSTRACT

A fifth-wheel to fifth-wheel tow bar for semi-tractors which permits a selective height adjustment of the towing end of the bar to adapt to a proper level for attachment to the vehicle to be towed, and including a triangulated support system and hydraulic powered adjustment and lifting means in the preferred embodiment.

5 Claims, 8 Drawing Figures

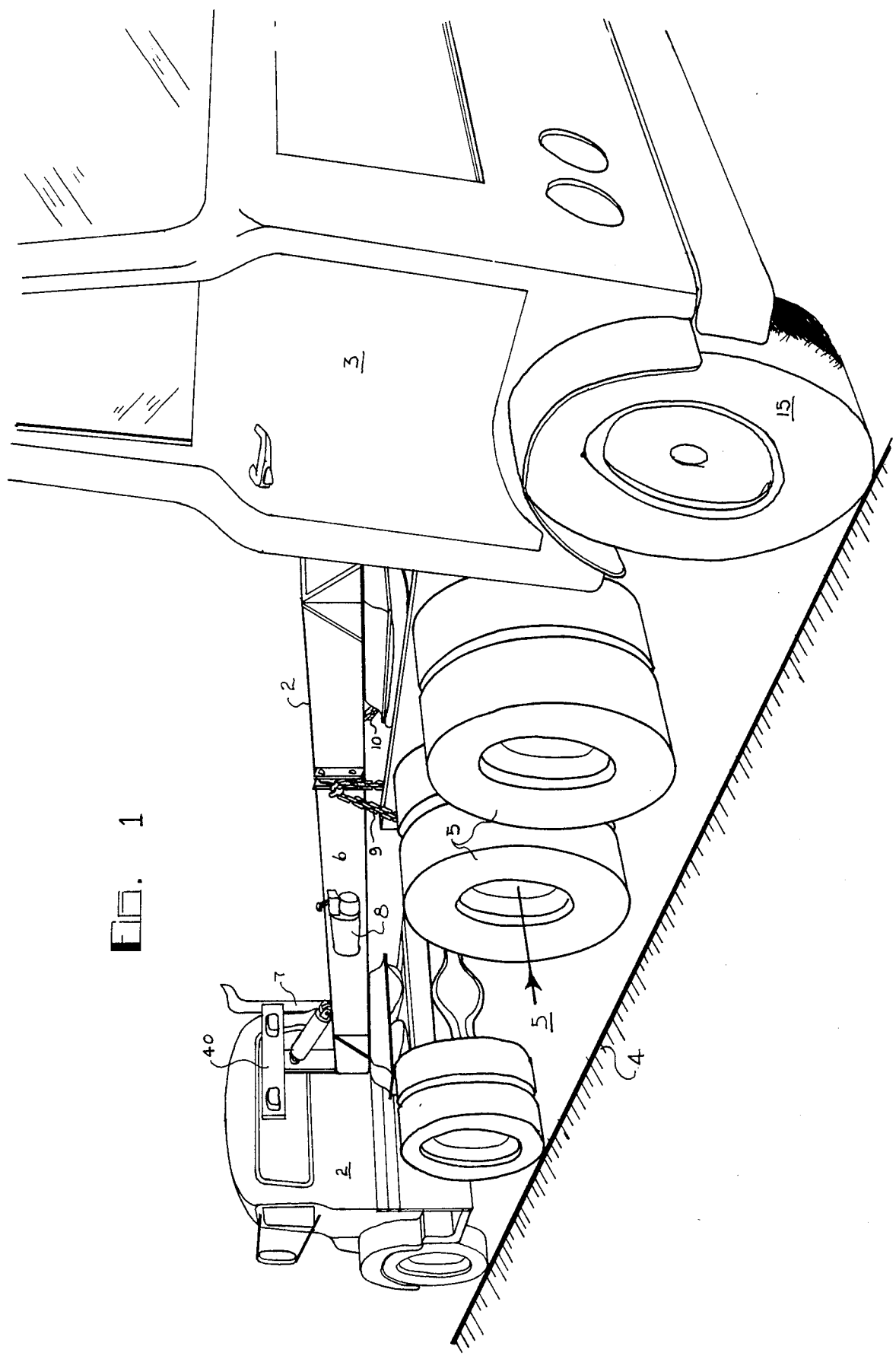

TOW BAR FOR SEMI-TRACTORS HAVING TRIANGULATED SUPPORT SYSTEM AND ADJUSTABLE DUAL CYLINDER HYDRAULIC CONTROL

FIELD OF INVENTION

This invention relates to improvements in tow vehicles for semi-tractors.

BACKGROUND OF THE PRIOR ART

The breakdown of a semi-tractor which is hauling a cargo trailer while en route or at a location away from a home station having service facilities, obviously an inconvenience, is also a costly interruption in the operating routine of a trucking fleet.

Typically in the event of a breakdown, a tow truck and service person and a substitute semi-tractor (with driver) are dispatched to the site. The substitute semi-tractor is hooked up to the cargo trailer to allow completion of the intended trip and the disabled semi-tractor is towed to a service location and returns the original (or substitute) driver. Various tow trucks, tow lifts and other types of towing apparatus for semi-tractors have been described in U.S. Pat. Nos.: 3,715,042, 4,149,643, 4,316,617, 4,152,006, 4,047,733, 3,649,048.

U.S. Pat. No. 4,149,643, entitled "Truck Tow Lift" and issued on Apr. 17, 1979, describes a fifth-wheel connection between a first towing semi-tractor and a second (presumably disabled) towed semi-tractor. In this apparatus, a lifting winch mechanism is mounted on a rectangular frame which includes SAE king pins at each end thereof for connection to the fifth wheels respectively of the first towing semi-tractor and the second towed semi-tractor. Rigidizing members are included in the frame; the lifting winch mechanism lifts and supports the rear wheels of the towed semi-tractor from ground contact for towing by the first semi-tractor.

OBJECTS OF THIS INVENTION

It is an object of this invention to provide an improved fifth-wheel to fifth-wheel towing device for semi-tractors. In the invention, a single beam operatively connects oppositely facing vehicles in towing relationship by means of SAE king pins connections at opposite ends thereof. In this regard, it is an object of the invention to provide hydraulic operating means, in a fifth-wheel to fifth-wheel towing device so that king pin interconnection between the towing and towed vehicles is facilitated and so that lifting of the towed vehicle is conveniently effected. The hydraulic system is disconnected after king pin engagement is secured and lifing is accomplished; a fixed, secure triangulated support harness for the towing and the towed vehicle while in operative engagement is provided for towing. In this manner a secure, mechanically advantageous attachment is achieved. The weight of the towed vehicle is appropriately set upon the fifth wheel of the towing semi-tractor.

Particularly, it is an object to provide a tow bar which is economical in design and is useful for small trucking fleets where it is ordinarily impractical or uneconomical to maintain a dedicated towing vehicle. The tow bar can be applied to any existing semi-tractor in a matter of minutes; the tractor need not be dedicated to any particular towing function.

It is a further object to provide in such an apparatus a simple, convenient, economical and light in weight tow bar for a semi-tractor, which as will be related below, is adaptable to towing differently configured semi-tractors and provides considerable advantage over prior devices utilized for similar purposes. The hydraulic operating means, with controls therefor, are conveniently located within or on the tow bar for easy access; the power source for the hydraulic system may be obtained either from the air-hose connection conventionally provided in semi-tractors or an auxiliary power source.

It is also an object of this invention to provide such a tow bar for a semi-tractor which includes (1) first hydraulic cylinder means, adapted for adjusting the height of the towing end of the tow bar for convenient attachment to the fifth wheel of the semi-tractor to be towed and (2) a second hydraulic cylinder means adopted for lifting the rear wheels of the semi-tractor to be towed off the ground so that an operative towing relationship in which the towed semi-tractor is maintained in a triangulated support harness during the towing operation may be achieved when the hydraulic means are completely released. Such hydraulic means are controlled by control means located upon said tow bar and each may be operatively selected by a diverter valve control.

Further, in such an apparatus, it is an object to provide a guide plate means at the fifth wheel king pin connection for the semi-tractor to be towed, whereby a guide means is provided to facilitate sliding attachment of the tow bar. Indeed, the tow bar is capable of one man operation in transporting a substitute semi-tractor to a breakdown site and returning the disabled semi-tractor to a fleet home base.

The apparatus is compact, economical, easily and quickly attachable both to the towing semi-tractor and to the semi-tractor to be towed. It is conveniently controllable by the operator in simple operations when compared with other types of devices, such as a conventional fifth wheel wrecker, intended for similar purposes.

BRIEF DESCRIPTION OF THE DRAWINGS

These and other advantages will be understood by reference to the following description of the preferred embodiment, taken in conjunction with the drawings in which:

FIG. 1 shows in perspective the towing and towed semi-tractors in an operative towing relationship as connected by the apparatus of the invention.

DESCRIPTION OF THE PREFERRED EMBODIMENT

Figure 1A:
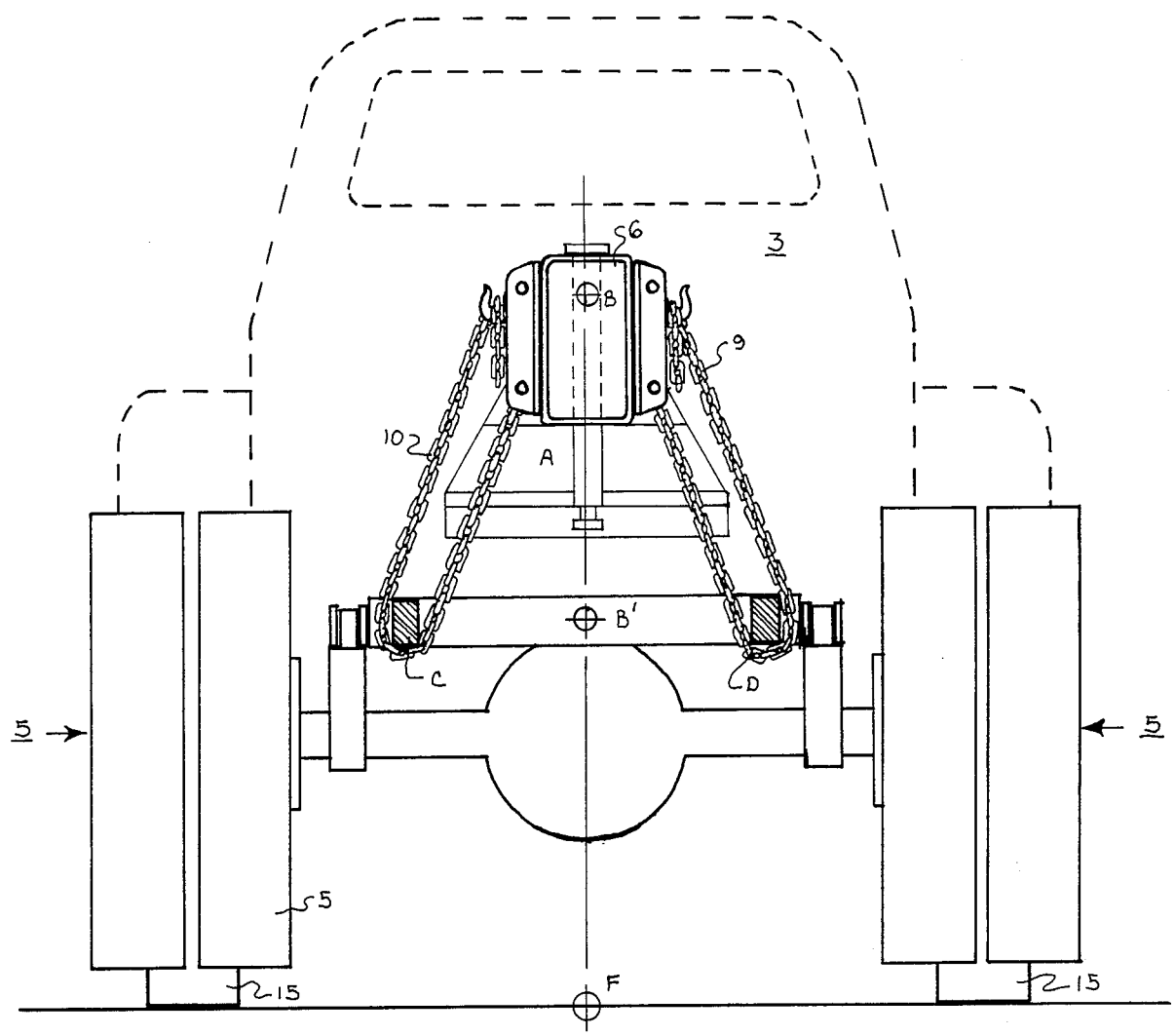
FIG. 1A is a cross-section view, taken through the section defined by the line extending through the width of the towed vehicle from -5- in FIG. 1, showing the triangulated support harness for the towed vehicle provided by the invention.

In the operative towing relationship shown in FIG. 1, the tow bar of the invention is identified by reference numeral 1, connecting the towing semi-tractor, 2, and the towed semi-tractor 3. For clarity in illustration, the cab of the towed vehicle, having its front wheels on the "ground" plane, is not entirely shown; although for purposes of explaining the invention, an entire semi-tractor is assumed to be affixed to the tow bar. The ground plane is indicated by the line having reference numeral 4; it is evident that in the towing relationship, the rear wheel pairs 5 of the towed semi-tractor are elevated off the ground in the towing relationship. The front wheels of the towed semi-tractor 15 which are on the ground are directionally locked with the wheels straightened as is conventional in towing operations.

The tow bar apparatus consists of a single length of beam, 6, having a first hydraulic cylinder means, 7, mounted thereon at the end of the tow bar connected to the first towing semi-tractor. The hydraulic control system for the unit, 8, is mounted at an intermediate location thereon between opposite ends of the bar. A second hydraulic cylinder attached to a cable means and employed for lifting the rear frame of the towed semi-tractor off the ground before the towing harness is attached, is mounted co-extensively in the beam. A floodlight or spotlight, such as indicated at 40, may also be provided.

In the operative towing relationship, the rear wheels of the towed vehicle are maintained off the ground by segments of support chains, 9 and 10, which respectively hook up to opposite (right and left) sides of the rear frame of the towed semi-tractor to provide a triangulated truss support harness in which the tow bar defines the apex of one triangular support, as is more fully depicted in FIG. 1A. In this manner, the weight of the towed semi-tractor, 3, through the tow bar, 6, is set upon the fifth wheel of the towing semi-tractor, 2, through the fifth wheel king pin connections to the respective semi-tractors at the respective ends of the tow bar.

With reference to FIG. 1A, a multi-triangulated towing relationship is defined by (1) the king pin connection at the fifth wheel frame of the towed semi-tractor (referred point A) and the support chains connecting the towed semi-tractor to the tow bar. The chains extend from an intermediate point on the tow bar, (reference point B), to the respective connections (points C and D) at the sides of the rear frame of the towed semi-tractor. The relationship is further depicted in FIG. 1B in which, identifying letters corresponding to FIG. 1A show the geometric relationship of the triangulated support by which the towed semi-tractor becomes fixed and immobile with respect to the beam tow bar and the towed semi-tractor and tow beam become, and act like, a single unit transported by the towing semi-tractor.

Figure 1B:
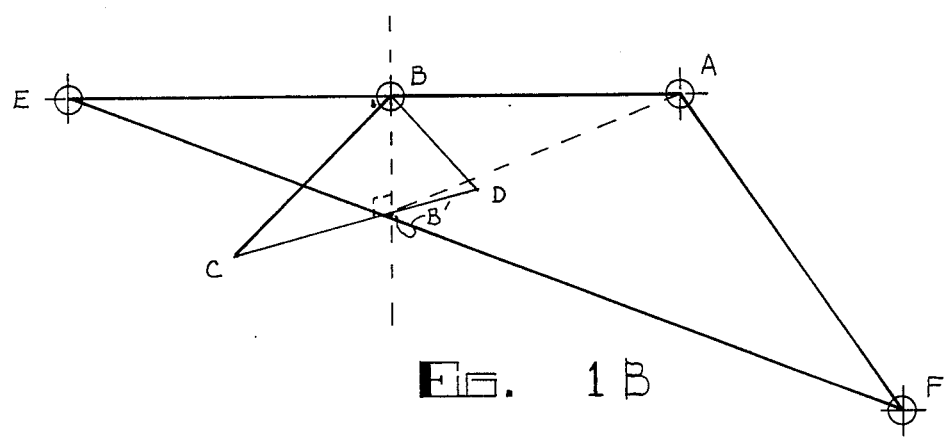
FIG. 1B depicts the mechanically triangulated relationship of the towed vehicle with respect to the tow bar during the towing relationship.

In FIG. 1B this multi-dimensional multi-triangulated support relationship is schematically illustrated. Points A and E represent the king pin connections of opposite ends of the tow bar and the remaining letters identify corresponding points on the towed semi-tractor as indicated in FIG. 1A. Thus, Point A represents the king pin connection point to the towed vehicle; Point B is the apex point on the tow bar to which the support harness chains or cable are connected and Points C and D represent the support chain harness connections to opposite sides of the rear frame of the towed semi-tractor. Point E represents the king pin connection to the fifth wheel of the towing semi-tractor. Point F represents the front wheels of the towed semi-tractor. Point B' is midway between Points C and D and is directly beneath Point B. A first triangulated support is formed by Points B, C and D defined by the chains of the harness which connects the rear frame of the towed semi-tractor to the tow bar. A second triangulated support is formed by Points A, B and B' between the king pin of the towed semi-tractor and the tow bar, and the mid point between the chain harness connections through the frame of the towed semi-tractor to the kingpin connection. In the towing relationship when the tow bar is connected to Point E (the king pin of the tow semi-tractor), the entire weight of the towed semi-tractor rests upon king pin Point E and the front wheels of the towed semi-tractor, in a triangulated relationship of Points E, A and F.

As used herein, the term "bar" is intended to refer to a length of an integral single unit beam, such as a box beam which is described as the preferred embodiment, an "I" beam or "U" beam, a rod or cylinder shape or other similar lengthwise unit connecting means which has a nominal width so that the apex of a triangulated support occurs at the "top" of the bar. It is not intended that the "bar" as referred to herein include a frame structure having a lateral width such as a rectangle frame formed from at least four separate elements.

Figure 2:
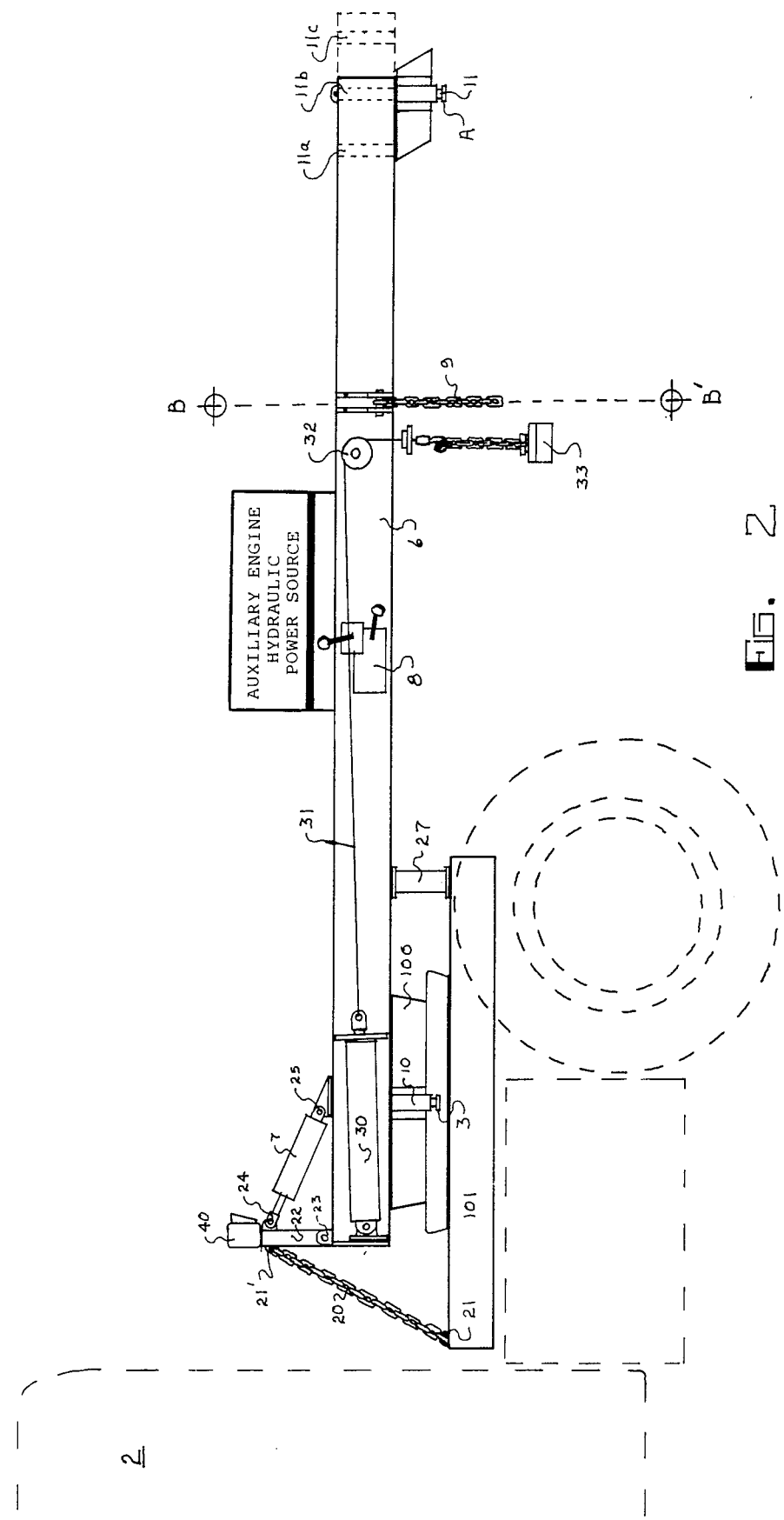
FIG. 2 is a side elevation view of the apparatus as affixed to the bed of the towing semi-tractor, showing various pivot points; and, in a cut away segment, the hydraulic operating mechanism of the apparatus.

In the elevation view of the apparatus shown in FIG. 2, the lengthwise pivot points and hydraulic mechanisms used in connection with the apparatus are shown in the relationship in which the tow beam is installed upon the first towing semi-tractor. The single box beam, 6, includes SAE king pins, 10 and 11, (corresponding to points E and A of FIG. 5A) for connecting respectively to the tow, and towed semi-tractors.

In effecting an operative relationship, the apparatus of the invention is first connected to the tow vehicle by inserting king pin, 10, into the fifth wheel connection, 100 mounted on the frame, 101, of the first tow semi-tractor, 2, shown in phantom view in FIG. 2. In the discussion herein, it is assumed that the fifth wheel king pin connections of the semi-tractors are conventional with respect to the frame and/or suspension system of the vehicle. No special adaption of the vehicle is necessary for use of the invention.

Connection of the beam to the tow vehicle may be accomplished, for example, by allowing the tow beam to extend from the elevated surface of a loading dock and by backing up the semi-tractor to effect the king pin connection in the same manner as connection to a trailer. Alternatively a lift truck may be used. A chain or other flexible connecting means, 20, connects from the front of the base of the frame of the towing semi-tractor from a location 21 which is forward of the fifth wheel (and at the mid point of the width of the frame), to the top location, 21, of a member 22 which perpendicularly extends upwardly from the forward end of the tow beam 6.

Chain 20 may optionally take the form of an inverted "Y" or "V" and allow a three point connection between the tow bar and opposite sides of the semi-tractor frame. In this manner, the tow bar is prevented from laterally swivelling in the king pin connection when the first semi-tractor, with tow bar attached, is in transit. Member 22 is affixed to beam 6 in an incrementally rotatable hinged relationship therewith, such as by the pin and bushing attachment indicated by 23. On the opposite upper end of member 22, a first hydraulic cylinder, 7, is connectingly provided to attach to beam 6 at a point location approximately above the king pin connection 10 at Point E. The connection of the opposite ends of the hydraulic cylinder to the beam 6 and extending member 22 is accomplished by means such as the pin and bushing shown at 24 and 25 which allow angular movement while the cylinder is operative to vary the triangular relationship defined at points corresponding to the locations at 23, 24 and 25. In this manner, when chain 20 is connected between points 21 and 21', extension and contraction of the cylinder means 7 lowers and raises the opposite end of the beam 6 at Point A to adjust to the height of the presenting fifth wheel of the semi-tractor to be towed so that the king pin, 11, may be conveniently engaged therewith. A removable or hinged support block, 27, may be optionally provided for resting the beam tow bar member on the rear frame portion of semi-tractor frame 101, while the apparatus is transported to the site of the unit to be towed.

Securely anchored to the forward end of the tow beam is a hydraulic lifting cylinder, 30, which longitudinally extends inside the beam, 6, in the event a box beam is utilized, as in the preferred embodiment described. A wire rope, cable, chain, or other flexible connecting means, 31, is connected to the cylinder and extends over a pulley, 32, and includes a connecting means, 33, by which an attachment is made to the vehicle frame for lifting the rear wheels of the semi-tractor to be towed.

In the connection of the tow bar to the semi-tractor to be towed, operation of the hydraulic cylinders is accomplished while chain 20 is attached and rest block 27 is removed. Because the length of the rear frame of semi-tractors which may be towed varies, it is preferable that the location of king pin 11 for attachment to the towed vehicle be movable to adapt to different semi-tractors encountered. Thus, multiple pin locations may be provided, (for example, every 6 inches,) as are shown at 11a, 11b and 11c in the beam. The beam may include concentric sliding members, a sliding plate, or a rotatable means to which the king pin is attached to provide such an adjustable presenting length for the beam; or other means may be appropriately adapted to achieve this purpose as well.

Once the tow bar is secured to the towing vehicle and transported to the site of the vehicle to be towed, the tow bar is connected to the latter, again, simply by backing the tow vehicle and directing the bar into the fifth wheel kingpin connection of the vehicle to be towed. In this regard, height of the king pin connection 11 of the towed end of the bar is appropriately adjusted by manipulation of the cylinder 7 as related above so that engagement is facilitated.

Figure 4:
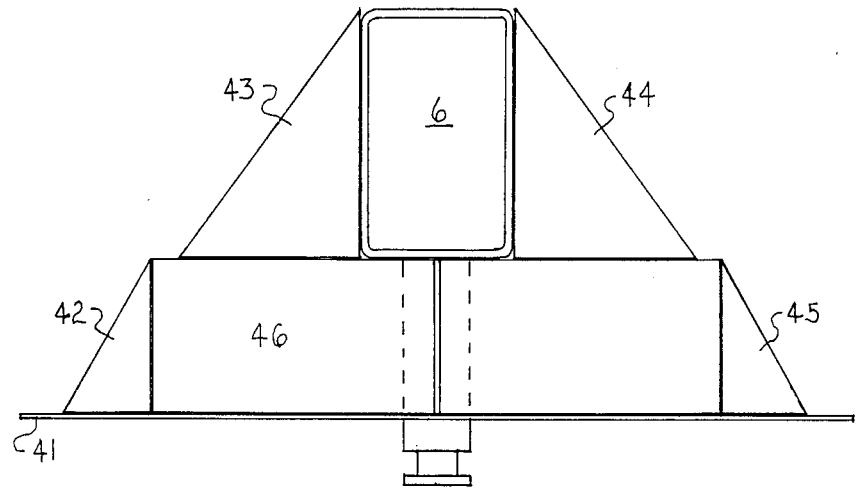
FIG. 4 is a cross section view of the tow bar taken through Sections -4- -4- of FIG. 3 showing the fifth-wheel king pin connection at the opposite ends of the bar.

Attachment of the king pin to the fifth wheel is facilitated by means of a flat plate, which slides over the fifth wheel, essentially in the same configuration as the king pin connection on a trailer. Such a plate is shown in the cross section of FIG. 4 at 41 in which, with respect to tow bar 6, support gussets for the king pin connection are also shown at 42, 43, 44 and 45 and a supporting cross member is shown at 46.

Figure 5:
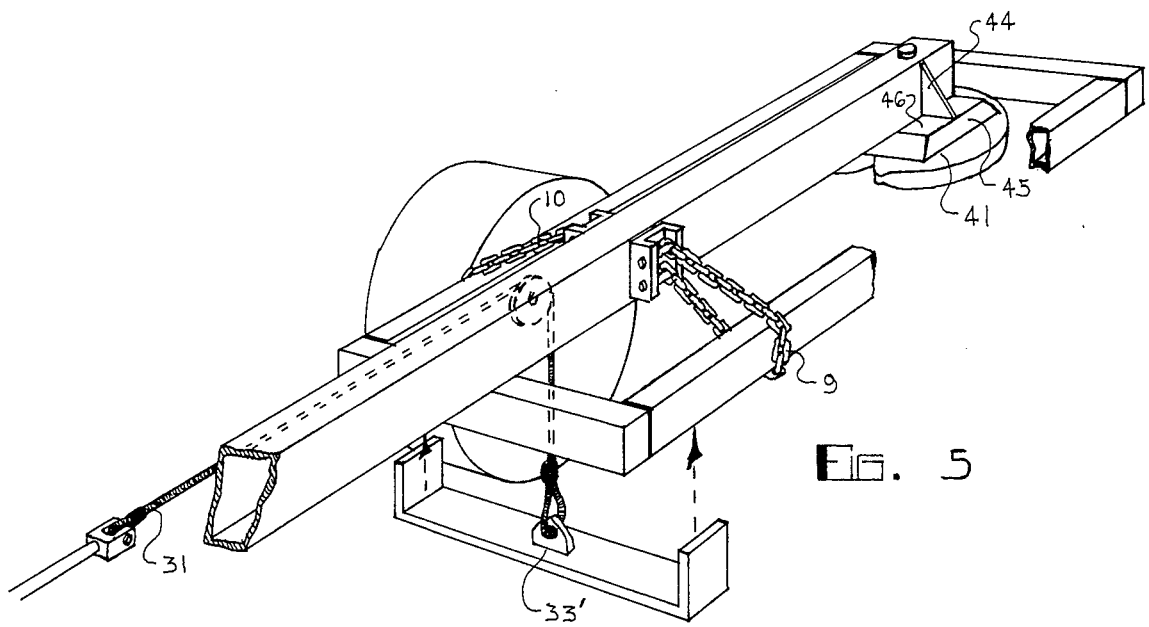
FIG. 5 depicts a further detail showing the relationship of the lifting means in conjunction with the frame of the towed vehicle in connection with the use of the apparatus.

After the king pin connection 11 to the semi-tractor to be towed is secured, the lifting cylinder 30 is employed to raise the rear wheels of the towed semi-tractor off the ground. In this regard, a lifting saddle is preferably utilized, such as is depicted in FIG. 5 at 33. Such a saddle includes a bar, hanging from the cable 31; the bar in length extends slightly beyond the outsides of the semi-tractor frame. The bar has upwardly extending ears to embrace the outside sides of the frame within the confines thereof. The middle of the pendant lifting saddle includes a connecting means 33' for attachment to flexible cable means 31 which is in turn attached to the end of the lifting cylinder after passing over the pulley means 32. Once the triangular harness secures the rear frame of the semi-tractor to be towed to the tow bar, the lifting cylinder and saddle is completely released and the triangular support harness provides the only support for the towed vehicle. The lifting saddle may be attached to the cable by means of a releasable pin. In this manner, once the harness chains 9 and 10 are secured and the lifting cylinder is releases, the saddle is removable and can be stored in a convenient location.

In this manner, after the two semi-tractors are connected by their respective king pins, the lifting saddle will "seat" within the frame of the semi-tractor to be towed and insure that each side of the rear frame is positioned equidistantly with respect to the extending tow bar. In this manner, after the rear wheels are raised off the ground, the securing chains 9 and 10 will be accurately triangulated. Then, the chains of the harness are fixed on opposite sides of the tow beam to wrap around the rear frame or axle of the towed semi-tractor after its wheels are lifted off the ground. Either before or after lifting, the support chain 20 between points 21 and 21' on the front end of the two bar is disconnected, although it is preferable that the connection be released before lifting. During towing chain 20 must be released to allow the tow beam/towed semi-tractor combination to swivel in the kingpin connection in the same manner as a conventional trailer. When the vehicle is towed, the tension in the lifting cylinder 30 must be completely released; the triangulated support harness provides the sole support. Also, in the towing mode, the front wheels of the towed vehicle should be directionally secured in a straight manner as is conventionally known in towing operations such as by use of a rope or other locking connection to the steering wheel of the towed vehicle.

To release the towed vehicle once the towing destination is reached, the lifting cylinder 30 and the saddle 33 are used to lift the vehicle sufficiently so that the chains may be released, and the towed vehicle is then lowered.

Figure 6:
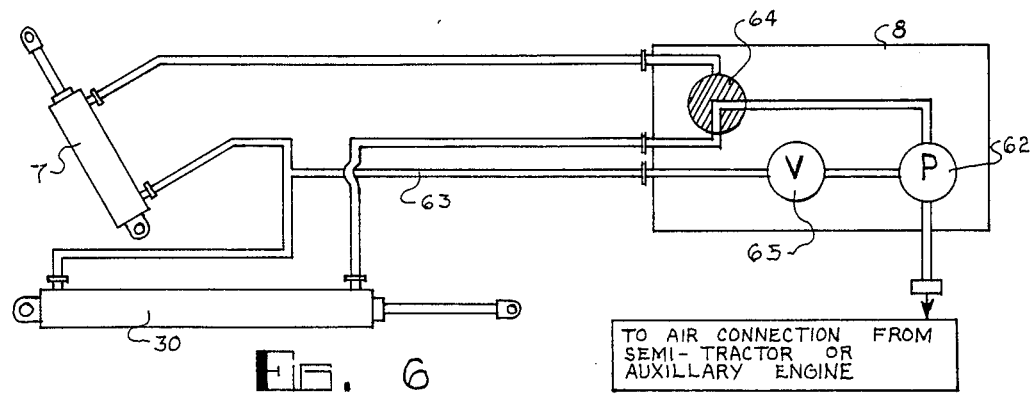
FIG. 6 shows a typical relationship of the hydraulic control system of the apparatus with respect to control valves and connection to the power source.

Hydraulic control of the unit is effected by means of a control system, 8, mounted on the beam which is shown in detail in FIG. 6. The system includes a hydraulic control valve which is operated to extend or contract each of cylinders 7 or 30, individually. A diverter valve is employed to select the particular cylinder operable at a particular time. In this regard, the hydraulic control system of the tow bar is connected to the hydraulic lines of the towing semi-tractor, using the conventional connection to the semi-tractor's air system. Since such a connection is conventional, the connectors, hoses and the like are not shown, although they are understood to be present. The hydraulic system master line is connected to control unit 8 which includes a first diverter valve means 64 which selects which of the two hydraulic cylinders, 7 or 30, of the apparatus will be in operative condition. Once cylinder selection is accomplished, further control of the cylinder is achieved my means of hydraulic cylinder control means 65 which regulates expansion and contraction of the particular cylinder. The hydraulic connection to the control valve and cylinders is similarly conventional with respect to connectors, hoses and relationships for the particular cylinder.

With reference to FIG. 6, an exemplary control system is shown using the air system of the towing semi-tractor as the power source. The air system powers a ½ horsepower piston pump air motor 62 which is capable of pumping up to 2,000 pounds per square inch in the system. A common hydraulic return line 63 is provided for both operative cylinders 7 and 30. The diverter valve 64 selects the operative cylinder, which in turn is controlled by control valve 65, in which manner hydraulic flow to and from the cylinder is manipulated. While not shown so that the control system may be more clearly described, the oil reservoir which is conventional in such a hydraulic system is also included.

Dimensions of the unit and specifications for the operating equipment should be evident to those familiar with trucking equipment, however, it has been found that an overall length for the tow bar of 15' 5" is generally useful in conjunction with a 10" square box beam. A suitable height adjusting cylinder is a 3"×18" hydraulic cylinder and a lifting cylinder oppropriate for mounting within the beam is a 4"×24" cylinder (the later length provided indicates travel of the cylinder). Five-eights inch (⅝") wire rope is sufficient for use as the flexible lifting, connecting or supporting means of the invention. Assuming a tow bar length of 15" 5", the king pin connection to the semi-tractors is approximately 26" from the front end of the bar and the center-to-center distance between king pins is 12' 6", with the cable pulley for lifting the towed vehicle mounted within the beam approximately 32" from the towed vehicle king pin.

Figure 3:
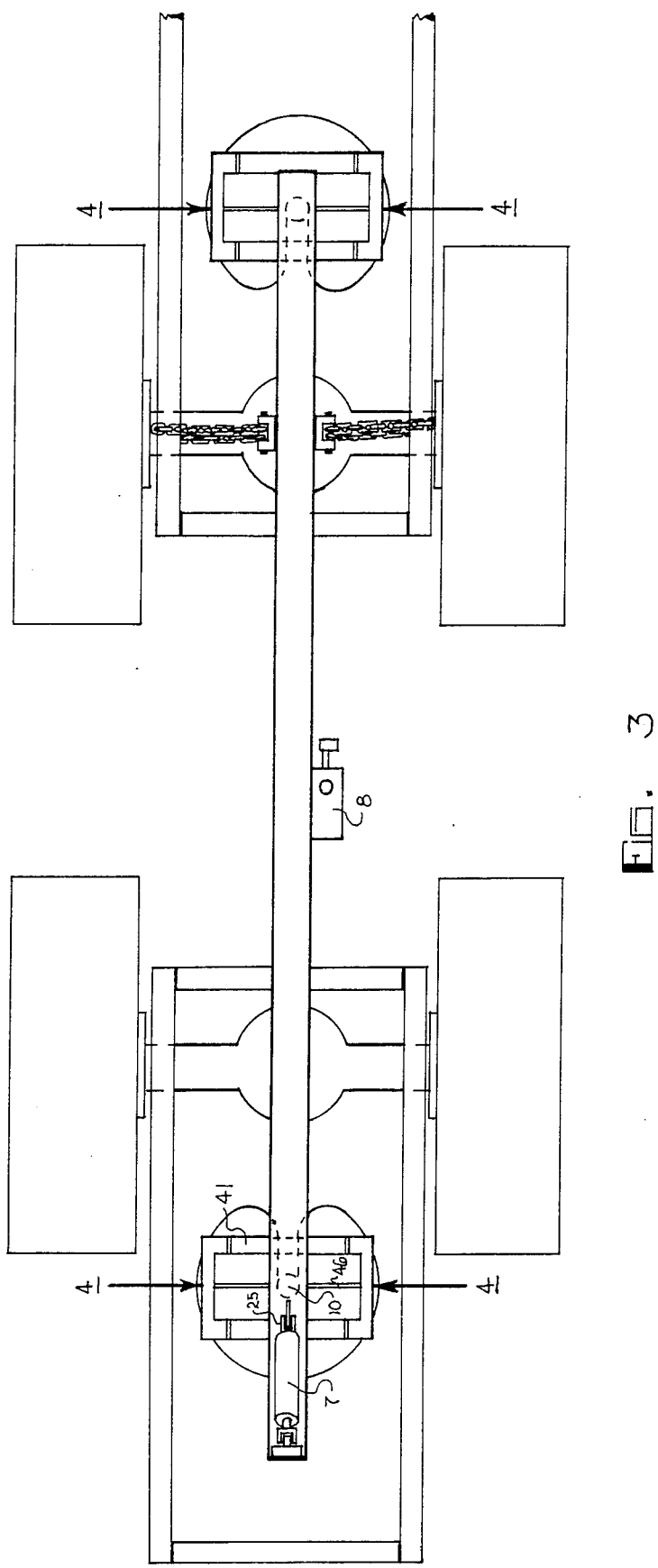
FIG. 3 is a plan view from above showing the tow bar in operative engagement with oppositely facing towing and towed semi-tractors.

As noted above, the air system of the semi-tractor may serve as the power source for the hydraulic pump. In such a configuration, lifting of the towed vehicle may be accomplished is about 3–5 minutes. Alternately, an auxiliary gasoline engine of about 3 to 5 horsepower may be utilized as the power source for the hydraulic system and lifting is accomplished in about 30 seconds. In the event such an auxiliary engine is used, it may be mounted on the tow bar itself in a location proximate the control system. For example, with reference to FIG. 3, such an engine may be installed on the top or sides of the tow bar proximate to location 8.

A conventional light bar for attachment to the front of the towed semi-tractor is also preferably provided to be connected to the electrical control system of the towing vehicle. Such a bar provides lights for directional and brake signals during transport and may be designed for transport within the inner space of a box beam tow bar. For example, such a light bar and associated electical connection may be designed to fit within or on the tow beam in the space from the end of the beam to be attached to the semi-tractor to be towed to the cable pulley. (i.e. between points A and B).

In summary, the invention provides a simple, easily used towing device, which can be put on almost any semi-tractor in about ten minutes and which in turn can be used to tow almost any semi-tractor. It rests all towed weight upon the fifth wheel of the tow vehicle and offers many advantages in ease of installation and use and lower cost over conventional fifth wheel wrecker apparatus.

What is claimed is:

1. A dismounting towing apparatus for semi-tractors in which oppositely facing semi-tractors are maintained in a connected towing relationship by means of a king pin engagement to the fifth wheel each of a first towing semi-tractor and a second towed semi-tractor, the improvement being a tow bar comprising:

a single beam connection between a king pin fifth-wheel engagement means of the respective first and second semi-tractors, said single beam extending in length from the king pin connection of the first semi-tractor to a first end point forward of said king pin connection and including at the said first end segment of the beam a means for selectively raising and lowering the opposite end of said beam to facilitate a connection of the king pin at the opposite end of the beam to to the fifth wheel of the second semi-tractor;

said means for selectively raising and lowering including a first expanding and contracting means extending as one side of a triangle in a triangular relationship defined by (a) a first point above the extending forward end point of the beam;

(b) a second point approximately adjacent the king pin connection, and (c) a third point at the forward extending end of the beam; and in which triangular relationship, the first point above the forward end of the beam is fixedly connected at a point forward of said beam end to the frame of the first semi-tractor; whereby the length of one side of the triangle is determined by expansion and contraction of the expanding and contracting means and the opposite end of the beam is correspondingly adjusted in height in accordance with the expansion and contraction of said means.

2. The apparatus of claim 1 including a means for lifting mounted upon said beam between the king pin connection for lifting the rear wheels of the semi-tractor to be towed off the ground, said lifting means including a pendant saddle for lifting the rear frame of the semi-tractor to be towed, said saddle comprising a triangular harness extending from the beam at an apex point adjacent the location of said saddle means, for securing opposite sides of the frame of the semi-tractor to be towed in a fixed triangular relationship for towing, and said lifting means further including a control means for said lifting means mounted upon said beam.

3. The apparatus of claim 2 including a plate perpendicularly extending from a king pin at the end of the beam to facilitate sliding engagement of the king pin to the fifth wheel connection.

4. The apparatus of claim 2 or 3 including means for providing multiple locations for the king pin connection at the opposite end of the beam to the semi-tractor to be towed.

5. The apparatus of claim 2 or 3 or 4 in which the control means includes a diverter valve for selecting a cylinder and an operating valve for controlling the cylinder selected.

* * * * *